United States Patent [19]

Carlile

[11] Patent Number: 4,865,346

[45] Date of Patent: Sep. 12, 1989

[54] COLLAPSIBLE CART ASSEMBLY

[76] Inventor: Ed Carlile, 245 Old Parsonage Rd., Summerville, S.C. 29483

[21] Appl. No.: 269,708

[22] Filed: Nov. 10, 1988

[51] Int. Cl.$^4$ .............................................. B62B 1/04
[52] U.S. Cl. .................................... 280/654; 211/132; 248/129; 280/655; 280/47.29; D34/24
[58] Field of Search .......................... 211/85, 132, 195; 248/129, 453; D34/24, 26; 280/652, 654, 655, 47.19, 47.26, 47.27, 47.29, 79.7

[56] References Cited

U.S. PATENT DOCUMENTS

| | | | |
|---|---|---|---|
| 2,433,886 | 1/1948 | Bremer | 280/47.19 X |
| 2,555,178 | 5/1951 | Young | 280/651 X |
| 2,918,297 | 12/1959 | Peters | 280/42 |
| 3,052,484 | 9/1962 | Huffman et al. | 280/654 |
| 3,804,432 | 4/1974 | Lehrman | 280/654 |
| 4,523,773 | 6/1985 | Holtz | 280/47.29 X |

Primary Examiner—Charles A. Marmor
Assistant Examiner—Michael Mar
Attorney, Agent, or Firm—Richard C. Litman

[57] ABSTRACT

A hand-propelled cart assembly for use in support of activities such as picnicking or beach-going includes a separable wheeled frame having an upright section comprising upper and lower portions. A foldable shelf member on the lower portion supports a cooler chest and is provided with elements precluding lateral shifting of the chest during movement of the cart. A pair of swingable arms on the lower portion accommodate one or more seating members such as folding chairs while receiver elements retain an umbrella and drink receptacles. The upper portion of the upright section supports a container having a fold down serving shelf adjacent an accessory panel presenting a radio, thermometer, clock and the like. A further receptacle, in the form of a closable bag is affixed behind the container. All components supported on the framework are individually removable and separately carried while the wheels may be likewise removed whereupon the cart is collapsed and folded for ease of transport, as in a vehicle trunk.

6 Claims, 2 Drawing Sheets

COLLAPSIBLE CART ASSEMBLY

FIELD OF THE INVENTION

This invention relates generally, to hand propelled vehicles and more particularly, to an improved foldable or collapsible cart assembly especially adapted to be used in association with the pursuit of recreational activities, such as picknicking or going to the beach.

BACKGROUND OF THE INVENTION

While one is engaged in any of various activities, whether occupational, vocational or recreational, the need often exists for a caddy apparatus to provide effortless transport of and ready access to, the necessary tools of the trade, devices or accessories associated with the chosen activity. Convenience is paramount and the apparatus should be extremely lightweight and portable while providing quick, effortless access to or accommodation of the articles needed by the user.

DESCRIPTION OF THE RELATED ART

An example of a prior art caddy apparatus will be found in U.S. Pat. No. 2,433,886 dated Jan. 6, 1948 to Bremer and which relates to a wheeled device having a plurality of foldable support members for accommodating various articles. Other foldable carts will be found in U.S. Pat. No. 2,918,297 issued Dec. 22, 1959 to Peters and U.S. Pat. No. 2,555,178 dated May 29, 1951 to Young. None of the above patents suggest the unique construction and adaptability of the present invention.

SUMMARY OF THE INVENTION

By the present invention, an improved hand-propelled cart assembly is provided which is especially adapted to support a diverse collection of articles intended to be used in the pursuit of recreational activities such as visits to the beach or attending a picnic. The cart is readily collapsed or erected and is constructed of lightweight material which may comprise a framework of aluminum or plastics tubing and may be easily assembled by suitable connecting devices such as elbows and tees or other mating fittings. Alternatively, the cart frame may be formed of bars, sheets or panels of lightweight material, likewise collapsible and/or foldable.

In practice, the instant cart assembly includes a lowermost pivotal shelf member for supporting a cooler chest and is provided with means cooperating with the bottom of the chest to laterally retain the chest in registry with the shelf. Projecting from the rear of an upright section are two swingable arms or brackets adapted to support one or more foldable beach chairs or other seating devices. The upper portion of the upright section serves to support a removable container, such as a picnic basket and which includes a fold-down front door usable as a serving tray or table when lowered. This container also includes an externally visible accessory panel containing various devices such as a thermometer, clock, radio and speaker, while the interior of the container is provided with a plurality of pockets adapted to contain various articles such as suntan lotion, etc. At the rear of the removable container is attached a closable bag which may carry selected other articles and/or be used for receiving trash. Further enhancements include provision for the storage of towels, a beach umbrella and drink receptacles.

All attached items on the cart may be quickly removed therefrom and individually carried or stored while the cart is not being used or is being transported, such as in the trunk of an automobile. This transportation mode is quickly attained by simply collapsing the two main components of the upright section and folding the bottom shelf and chair support brackets and alternately, two relatively large diameter wheels are slipped off axles protruding from the bottom of the upright section.

Accordingly, one of the objects of the present invention is to provide an improved collapsible cart assembly including a tubular framework providing a bottom chest supporting shelf, seating member supporting arms and a removable picnic basket having a displaceable shelf adjacent an accessory panel.

Another object of the present invention is to provide an improved wheeled beach cart assembly having an upright section separable into two portions with each portion adapted to removable support a plurality of components including a cooler chest, picnic basket, umbrella and drink receptacles.

A further object of the present invention is to provide an improved foldable and collapsible cart assembly including a tubular framework having a bottom pivotal shelf supporting a chest adjacent two removable wheels and a picnic basket removably affixed to the upper portion of the framework with an additional receptacle carried rearwardly of the basket.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
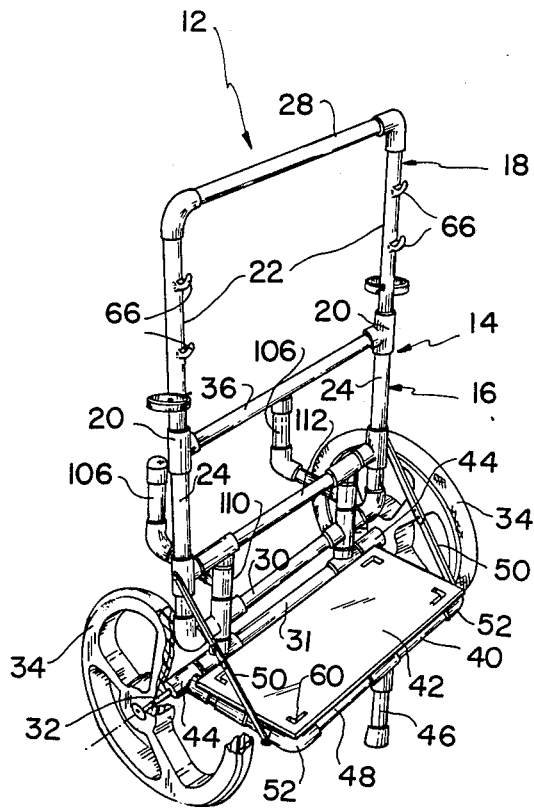
FIG. 1 is a perspective view of a typical cart frame according to the subject invention.

Referring now the drawings, particularly FIGS. 1 and 3, the present invention will be seen to comprise a cart assembly, generally designated 10, and which includes a frame 12 to which are affixed a plurality of removable components, the latter of which will be described in detail hereinafter.

The frame 12, although illustrated for the most part as comprising a tubular framework, will be understood alternately to be constructed of any suitable lightweight material of any configuration lending itself to ease of transport and collapsibility. Thus, a typical arrangement may comprise a plurality of elongated tubes of plastics or metal, such as PVC or aluminum respectively, or on the other hand, panels of pressed board or hardened expanded foam compositions (not shown).

The frame 12 includes an upright section 14 which in turn is made up of a lower portion 16 joined to an upper portion 18 by suitable coupling means 20 allowing of the quick disconnection and separation of the two frame portions 16,18. As shown in the drawings, the two frame portions are provided with parallel, spaced apart side arms 22,22 and 24,24 and the cooperating coupling means 20 may include sleeves fixed to the ends of one set of side arms, such as the lower arms 24,24. In this manner, the upper frame portion 18 is readily affixed to the lower frame portion 16 in view of the close friction fit therebetween. Alternatively, tubular elements of various portions of the frame 12 may be connected by means an integral socket construction (not shown) and wherein a slightly reduced diameter nose on one arm is closely fitted within the socket as provided by the open end of the other arm.

A top cross-arm 28 joins the tops of the two side arms 22 of the upper portion 18 and serves as a handle for the apparatus while the bottom of the lower portion side arms 24 are joined by means of a lower cross-arm 30. A bottom axle member 31 is affixed beneath the cross member 30 and includes stud spindles or axles 32,32 projecting from its ends and to which are removably attached the pair of wheels 34,34. To improve the stability of the lower frame portion 16, a transverse brace 36 extends between and joins the upper reaches of the two side arms 24,24.

Figure 3:
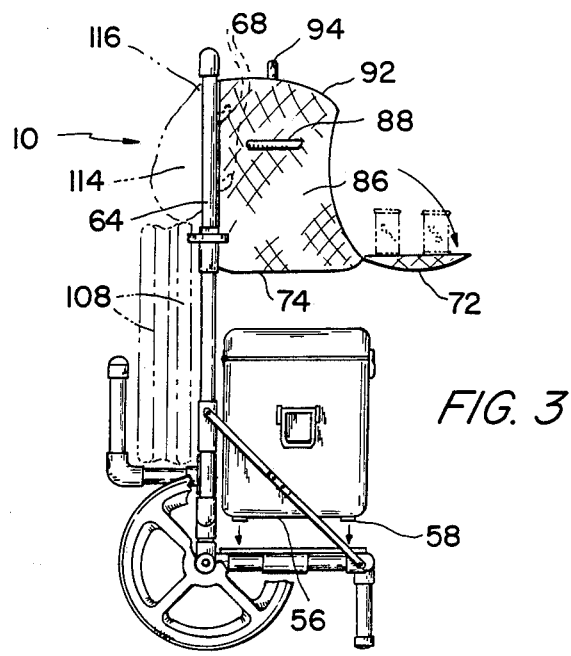
FIG. 3 is a side elevation of the apparatus of FIG. 2.
Figure 4:
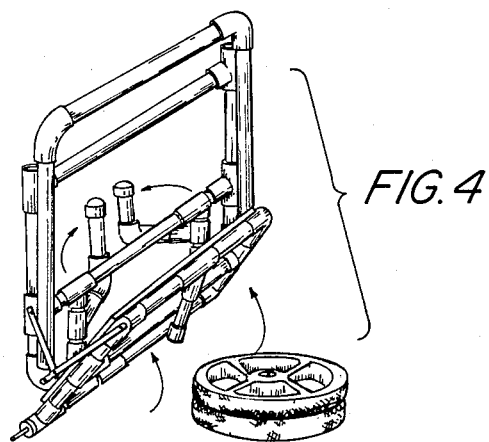
FIG. 4 is plan view of the cart shown in a collapsed condition.

Pivotally attached to the lowermost axle member 31 is a bottom shelf 40 preferably comprising a unitary, planar member having an upper surface 42 provided with two rearwardly disposed hinge means 44,44 connected to the member 31 to allow displacement of the shelf 40 from the lowered, use position of FIG. 1 to the folded position as shown in FIG. 4. A rest or foot element 46 is swingably attached to the forward edge 48 of the shelf and will be understood to support the entire cart assembly 10 in an upright position when the shelf is lowered and locked into the position as reflected in FIGS. 1-3. This locking is achieved by means of appropriate members such as the pairs of braces 50,50 pivotally connected together and having their respective free ends attached to the sides 52 of the shelf 40 and side arms 24.

The above described shelf 40 serves to support a cooler chest 54 and in order to positively retain this chest on the shelf during transport, locking or orientation means is provided between the chest bottom 56 and the top 42 of the shelf. Such means may comprise depending legs 58 on the chest bottom 56 and which engage within apertures 60 on the shelf 40. These legs may obviously define any configuration such as L-shaped members or the like and alternatively, the locking means may comprise upstanding projections on the shelf 40 (not shown) and which would engage within mating openings on the chest bottom.

Carried on the front of the upright upper portion 18 is a container, such as the illustrated picnic basket 62 having a rear wall 64 provided with suitable attachment means permitting ready attachment and removal of the container 62 from the frame upright 14. An example is shown in FIGS. 1 and 3 wherein a plurality of mounting lugs 66 will be seen to extend from the frame side arms 22,22 and engage within mating recesses 68 in the rear 64 of the container 62.

Figure 2:
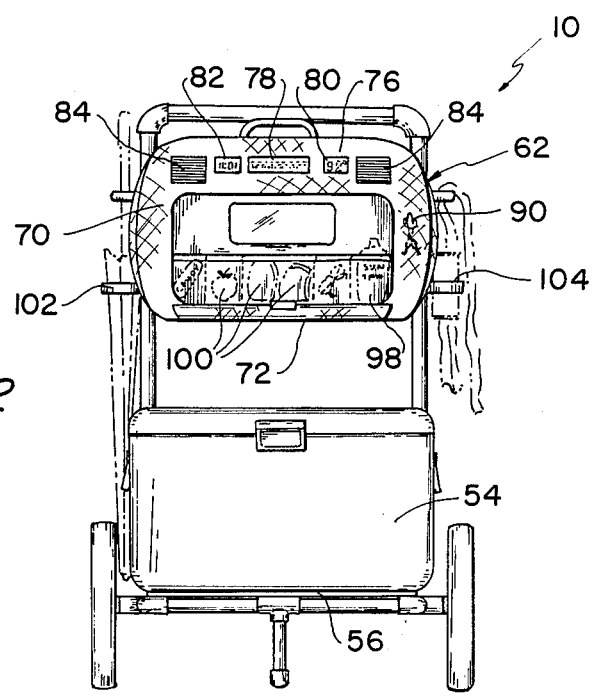
FIG. 2 is a front elevation of the frame of FIG. 1 and shown with several accessories affixed thereto.

The basket front wall 70 includes a door 72 hingedly attached adjacent the basket bottom 74 and which may be opened and lowered to the illustrated horizontal position whereby a serving shelf is provided. The front wall 70, above the door 72, presents an accessory area 76 within which are mounted a variety of devices such as depicted in FIG. 2. Included is a digital radio 78, digital thermometer 80, digital clock 82 and one or more audio speakers 84. The sides 86,86 of the basket are each provided with a towel holder 88. A key hook 90 is provided on the container, such as illustrated in FIG. 2, and offers convenient means for the temporary location of a user's key or key-ring. The basket top 92 will be seen to include a suitable handle 94 whereby the container 62 may be conveniently lifted onto or off the cart and carried when detached therefrom.

Mounted upon the interior of the basket rear wall 64 is a mirror 96 as well as a storage array 98, the latter of which comprises a plurality of tucks and gathers providing several adjacent compartments 100. One of the side arms 22 or 24 on one side of the cart frame is provided with a holder 102 for an umbrella while one or more beverage holders 104 are formed on the opposite frame side.

The upright lower portion 16 will be seen to include a pair of bracket arms 106,106 serving to receive and support one or more folding chairs 108 as shown in FIG. 3. Each arm 106 is movably attached to a vertical brace 110 spaced inwardly from one of the side arms 24 and having its opposite ends affixed to the lower cross arm 30 and an intermediate cross-member 112. The above referenced attachment will be understood to allow a swiveling displacement of the bracket arms 106 from a rearwardly projecting, use position as shown in FIGS. 1 and 3, to a stored position as depicted in FIG. 4.

A further receptacle is provided by means of an auxiliary storage bag 114 suitably removably attached to the rear of the container 62. This bag may be constructed of any appropriate material such as plastic and includes a closable top opening 116 which may be tucked, elasticized, provided with Velcro fasteners, or supplied with any other well known type of closure.

The cart assembly 10 of the present invention is fully utilized when appearing as in FIGS. 2 and 3 and wherein the plurality of storage elements are in place on the cart frame. Using the top cross-arm 28 as a handle, the cart assembly is easily rolled by means of the wheels 34, to and from the area of use. Thereafter, when it is desired to convey the entire assembly, such as in an automobile, the various attached components are simply lifted off the frame, after which the frame is collapsed and folded to provide a most compact arrangement as shown in FIG. 4. This procedure is quite simple and involves lifting up the frame upper portion 18 from its juncture with the lower portion 16, folding inwardly the two chair brackets 106,106, swinging the bottom shelf 40 upwardly and removing the wheels 34—34.

It is to be understood that the present invention is not limited to the sole embodiment described above, but encompasses any and all variations within the scope of the following claims.

I claim:

1. A collapsible cart assembly comprising in combination:

a frame including an upright section provided with an upper portion and a lower portion, said upright section having a front side and a rear side;

means for removably joining said upper and lower portions;

a transverse axle member extending beneath said lower portion and affixed thereto;

wheels removably attached to said axle member;

a shelf pivotally attached to said axle member for movement between a substantially horizontal extended position and a vertical collapsed position adjacent the front side of said upright section;

a container having a front wall including a pivotally attached front door movable between a closed position and a substantially horizontal lowered positioned and an accessory panel located above said door;

connection means permitting the removable attachment of said container to said front side of said upper portion;

a cooler chest having a bottom surface;

stabilizing means depending from said bottom surface of said chest for mating with stabilizing means on said shelf;

a pair of bracket arms projecting from the rear side of said lower portion, each of said bracket arms including a horizontal portion and a vertical portion attached to one end of said horizontal portion; and means for pivotally attaching the other end of each of said horizontal portions of said bracket arms to said lower portion for movement between a collapsed position adjacent said lower portion and an extended position for receiving and supporting a folded chair.

2. The cart assembly according to claim 1 including; holder elements on said upright section adapted to retain an umbrella, drink receptacle and the like.

3. The cart assembly according to claim 1 including; a rest element pivotally attached to said shelf and adapted to maintain said shelf in said extended substantially horizontal position with said cooler chest disposed on said shelf.

4. The cart assembly according to claim 1 including; locking means pivotally joined respectively to said shelf and said upright section lower portion and adapted, when extended, to maintain said shelf in said lowered substantially horizontal position.

5. The cart assembly according to claim 1 wherein, said accessory panel includes a radio and thermometer.

6. The cart assembly according to claim 5 wherein, said radio and thermometer include a digital display.

* * * * *